(12) United States Patent
Herman et al.

(10) Patent No.: US 7,866,542 B2
(45) Date of Patent: Jan. 11, 2011

(54) SYSTEM AND METHOD FOR RESOLVING IDENTITIES THAT ARE INDEFINITELY RESOLVABLE

(75) Inventors: Joshua Lee Herman, Las Vegas, NV (US); Jeffrey James Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/423,105

(22) Filed: Jun. 8, 2006

(65) Prior Publication Data

US 2007/0295797 A1 Dec. 27, 2007

(51) Int. Cl.
*G06F 17/00* (2006.01)
(52) U.S. Cl. ...................................... 235/375
(58) Field of Classification Search ................. 235/375; 707/1, 2
See application file for complete search history.

(56) References Cited

U.S. PATENT DOCUMENTS

| | | | |
|---|---|---|---|
| 5,796,835 A * | 8/1998 | Saada .......................... 713/172 |
| 6,438,543 B1 | 8/2002 | Kazi et al. ...................... 707/5 |
| 6,757,678 B2 | 6/2004 | Myllymaki ..................... 707/6 |
| 6,801,915 B1 | 10/2004 | Mack .......................... 707/100 |
| 6,804,680 B2 | 10/2004 | Melli .......................... 707/102 |
| 2004/0143588 A1 | 7/2004 | Russell ....................... 707/100 |
| 2005/0015389 A1 | 1/2005 | Novak et al. ................. 707/100 |
| 2005/0138152 A1 * | 6/2005 | Kruse ......................... 709/223 |
| 2006/0289647 A1 * | 12/2006 | Shafer ......................... 235/451 |
| 2008/0016233 A1 * | 1/2008 | Schneider ................... 709/230 |

* cited by examiner

*Primary Examiner*—Ahshik Kim
(74) *Attorney, Agent, or Firm*—VanLeeuwen & VanLeeuwen; Erin C. Ming

(57) ABSTRACT

A system and method for resolving identities that are indefinitely resolvable is presented. A resolution manager retrieves an account and resolves the account to existing entities. When the account is resolved into an existing entity, the resolution manager proceeds through a sequence of steps to ensure a load order independent resolution outcome by unresolving the entity, and possibly related entities, if resolution ambiguity arises. When the account does not resolve to an existing entity, the resolution manager creates a new entity with the account, and checks whether the new entity has relationships with other entities. If so, the resolution manager proceeds through the sequence of steps to ensure a load order independent resolution outcome as discussed above.

35 Claims, 9 Drawing Sheets

US 7,866,542 B2

SYSTEM AND METHOD FOR RESOLVING IDENTITIES THAT ARE INDEFINITELY RESOLVABLE

BACKGROUND OF THE INVENTION

1. Technical Field

The present invention relates to a system and method for resolving identities that are indefinitely resolvable.

More particularly, the present invention relates to a system and method for providing a load order independent resolution outcome by unresolving an entity, and possibly related entities, when resolution ambiguity arises.

2. Description of the Related Art

Data management is a key component to a business's success. A data management system may handle billions of customer accounts at a particular time, all the while attempting to maintain a high accuracy level. During the account management process, a data management system may "resolve" associated accounts into an "entity." For example, John Smith may have a checking account, a savings account, and a credit card account. In this example, the business may resolve each of these accounts into a single entity for John Smith.

An account may include account data, such as a name, address, phone number, social security number, etc. In addition, the account data may represent, for example, a person, place, event, time, object, biometric, or protein. Traditional resolution technologies may successfully resolve accounts into entities. For example, if two accounts both include a person's social security number, an obvious resolution exists and the two accounts are resolved into one entity. Some accounts, however, may only include a subset of account data. For example, if one account includes the name Patrick Smith, and the other account includes the name Pat Smith, it is not obvious as to whether these accounts should resolve into one entity. In many cases, when existing art encounters this ambiguous condition, existing art resolves the accounts into an entity when the account and entity includes a fairly large percentage of the same amount of data. A challenge found with these approaches, however, is that the resolution outcomes may be dependent upon the order in which accounts are resolved into an entity.

Another challenge found is that an account may equally resolve, or ambiguously resolve, to more than one entity. When this occurs, existing art typically resolves the account into one of the entities based on the highest score, first located, most recent data, etc., which may or may not be correct. For example, if a first entity included Patrick Smith, and a second entity included Patricia Smith, existing art may resolve an account for Pat Smith into the Patrick Smith entity. This may not be accurate because Pat Smith may actually refer to Patricia Smith, or may be the son or daughter of Patrick and Patricia Smith.

Furthermore, when an account resolves into an entity, existing art does not check ambiguity between other entities. For example, if an entity included accounts for Patrick Smith and Pat Smith, existing art would not resolve an account for Patricia Smith into that entity, but rather creates a new entity. In this example, existing art does not address the issue of whether Pat Smith should still resolve to Patrick Smith, Patricia Smith, or neither.

What is needed, therefore, is a system and method providing a load order independent resolution outcome by unresolving an entity, and possibly related entities, when resolution ambiguity arises.

SUMMARY

It has been discovered that the aforementioned challenges are resolved using a system, method, and program product that retrieves a first account, the first account including first account data that, for example, may represent a person, place, event, time, object, biometric, or protein. The system, method, and program product then resolve the first account to a plurality of entities and, in response to the resolving, identify ambiguity between the first account and one or more of the plurality of entities. The system, method, and program product then process the first account based upon the identified ambiguity.

In one embodiment, the system, method, and program product identify ambiguity by determining that the first account data equally matches data included in a first entity and a second entity, which are included in the one or more ambiguous entities. In one embodiment, the system, method, and program product results in an independent order resolution outcome.

In one embodiment, the system, method, and program product identify that the first entity includes the first account and a second account, and the second entity includes a third account. In this embodiment, the system, method, and program product unresolve the first entity. The system, method, and program product then create a third entity and include the first account in the third entity. The system, method, and program product then create a fourth entity and include the second account in the fourth entity. The system, method, and program product then relate the third entity to the second entity and the fourth entity. In this embodiment, the system, method, and program product detect that one of the ambiguous entities is also related to one or more of the plurality of entities that are not included in the one or more ambiguous entities.

In one embodiment, the system, method, and program product identify that the first account is not included in the first entity or the second entity. The system, method, and program product then create a third entity and include the first account in the third entity. In this embodiment, the system, method, and program product relate the third entity to the first entity and the second entity. In this embodiment, the system, method, and program product detect that one of the ambiguous entities is also related to one or more of the plurality of entities that are not included in the one or more ambiguous entities.

In one embodiment, the system, method, and program product, prior to identifying ambiguity, detect that the first entity includes the first account and a second account, and the second entity includes a third account. The system, method, and program product then modify the first account data, which results in the ambiguity that is between the first entity and the second entity. The system, method, and program product then unresolve the first entity. The system, method, and program product then create a third entity and include the first account into the third entity. The system, method, and program product then create a fourth entity and include the second account in the fourth entity. In this embodiment, the system, method, and program product relate the third entity to the second entity and the fourth entity. In this embodiment, the system, method, and program product detect that one of the ambiguous entities is also related to one or more of the plurality of entities that are not included in the one or more ambiguous entities.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
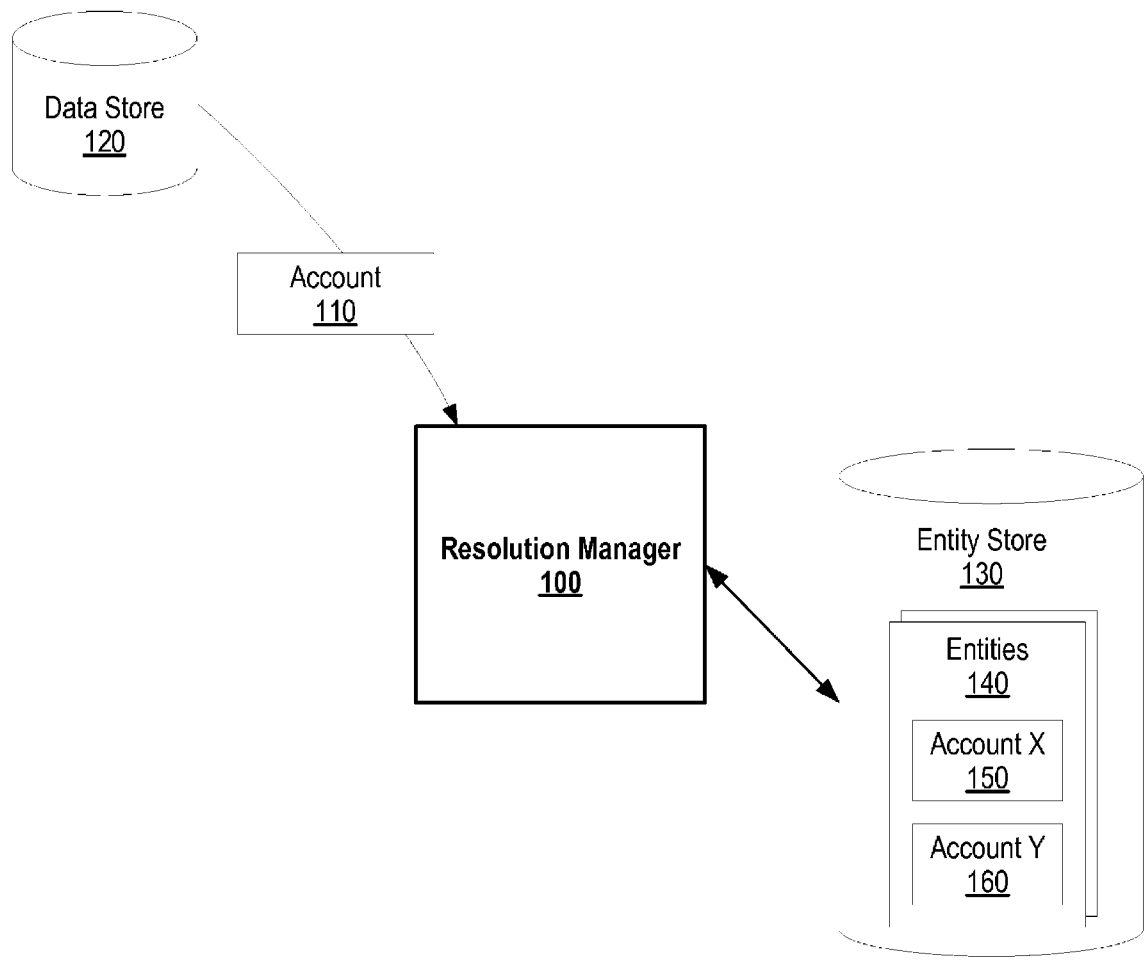
FIG. 1 is a diagram showing a resolution manager resolving an account into an entity while providing load order independent resolution, relational entity resolution, and ambiguity resolution.

FIG. 1 is a diagram showing a resolution manager resolving an account into an entity while providing load order independent resolution, relational entity resolution, and ambiguity resolution. Resolution manager 100 retrieves an account (account 110) from data store 120 and resolves the account to existing entities (entities 140) located in entity store 130. Account 110 may be a previously resolved account whose account data has changed, or account 110 may be a new account that has not yet resolved. In addition, account 110 includes account data, which may represent, for example, a person, place, event, time, object, biometric, or protein. Furthermore, the account data may include clear text values, encrypted text values, one-way hashed values, and/or anonymized values. Data store 120 and entity store 130 may be stored on a nonvolatile storage area, such as a computer hard drive.

Figure 6:
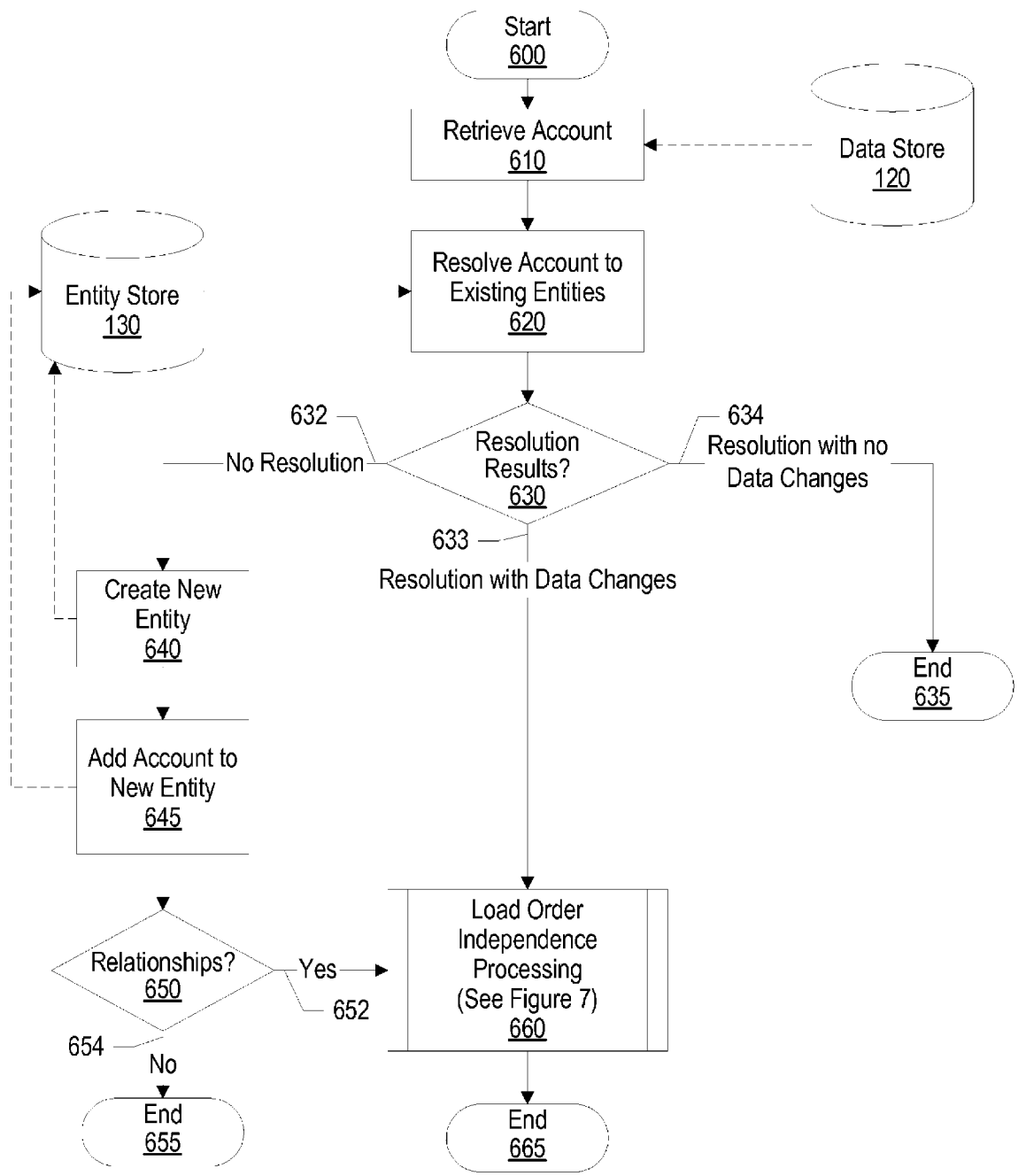
FIG. 6 is a high-level flowchart showing steps taken in resolving an account to existing entities.
Figure 7:
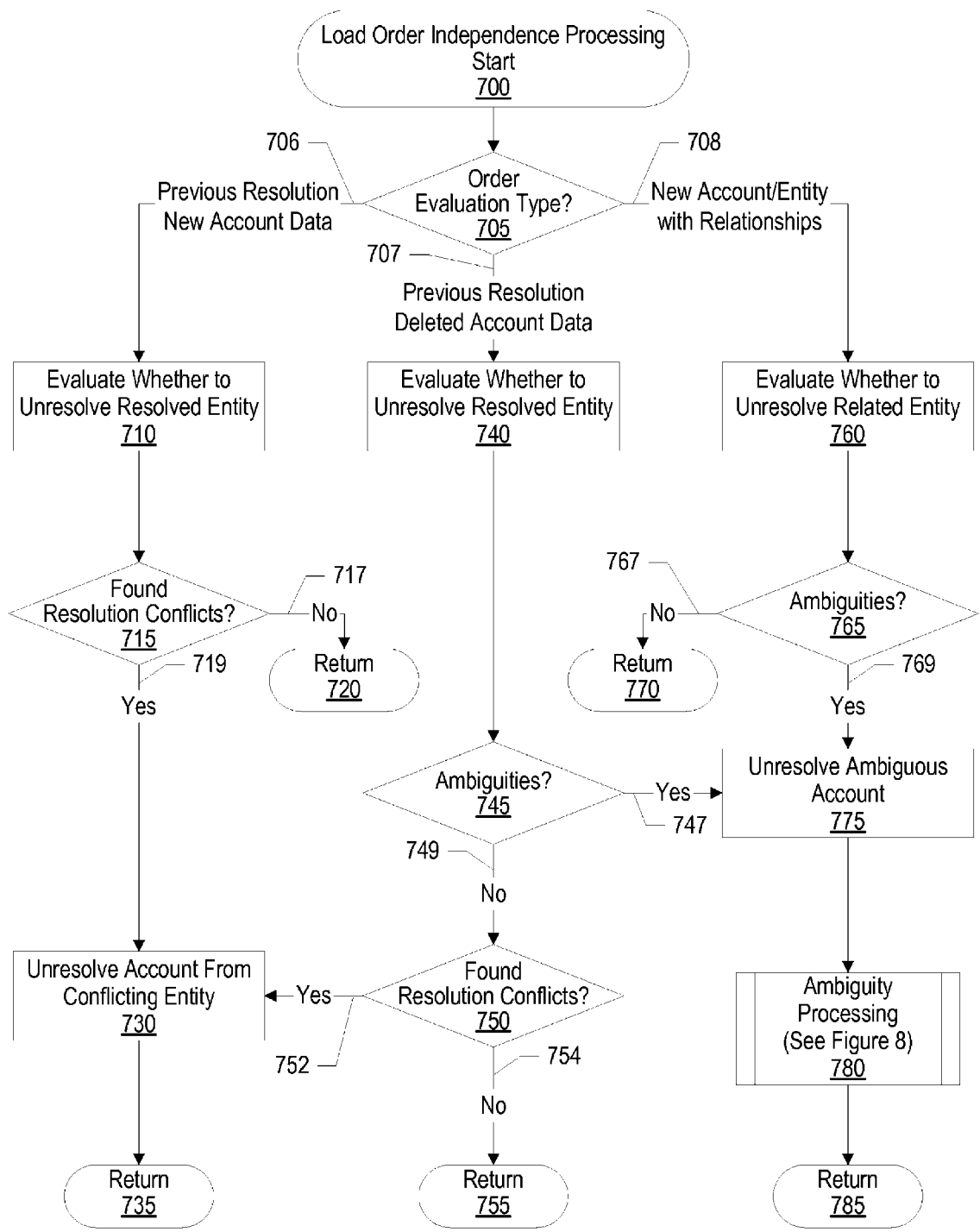
FIG. 7 is a flowchart showing steps taken in processing an account that results in an independent order resolution outcome.

When account 110 resolves into one of entities 140, resolution manager 100 proceeds through a sequence of steps to ensure a load order independent resolution outcome by unresolving the entity, and possibly related entities, if resolution ambiguity or resolution conflicts arise (see FIG. 7 and corresponding text for further details). When account 110 does not resolve to an existing entity, resolution manager 100 creates a new entity with the account, and checks whether the new entity has relationships with existing entities (see FIG. 6 and corresponding text for further details). If so, resolution manager 100 proceeds through the sequence of steps to ensure a load order independent resolution outcome as discussed above.

Entities 140 include accounts, such as account X 150 and account Y 160, that resolution manager 100 has previously resolved. During the resolution process, resolution manager 100 may use an existing process to determine how well account 110 matches to entities 140, such as "DB2 Identity Resolution" software. For example, resolution manager 100 may determine that account 110 includes a social security number that does not match a social security number in any of entities 140 and, therefore, resolution manager 100 creates a new entity and includes account 110 in the new entity. In another example, account 110 may have little information, such as the name "John Smith," and resolution manager resolves account 110 to multiple entities, which results in an ambiguous resolution. When ambiguous resolutions occur, resolution manager 100 includes account 110 in a new entity and relates the new entity to the entities that account 110 matched (see FIGS. 4, 8, and corresponding text for further details).

Resolution manager 100 also evaluates whether to unresolve entities that are related to account 110. For example, an existing entity may comprise two accounts that include "Patrick Smith" and "Pat Smith". Using this example, account 110 may include the name "Patricia Smith" and, in this example, resolution manager includes "Patricia Smith" in a new entity, unresolves the existing entity and creates two new entities. In turn, resolution manager 100 relates entity "Pat" to both entities "Patrick" and "Patricia" (see FIGS. 3A, 3B, and corresponding text for further details).

Figure 2A:
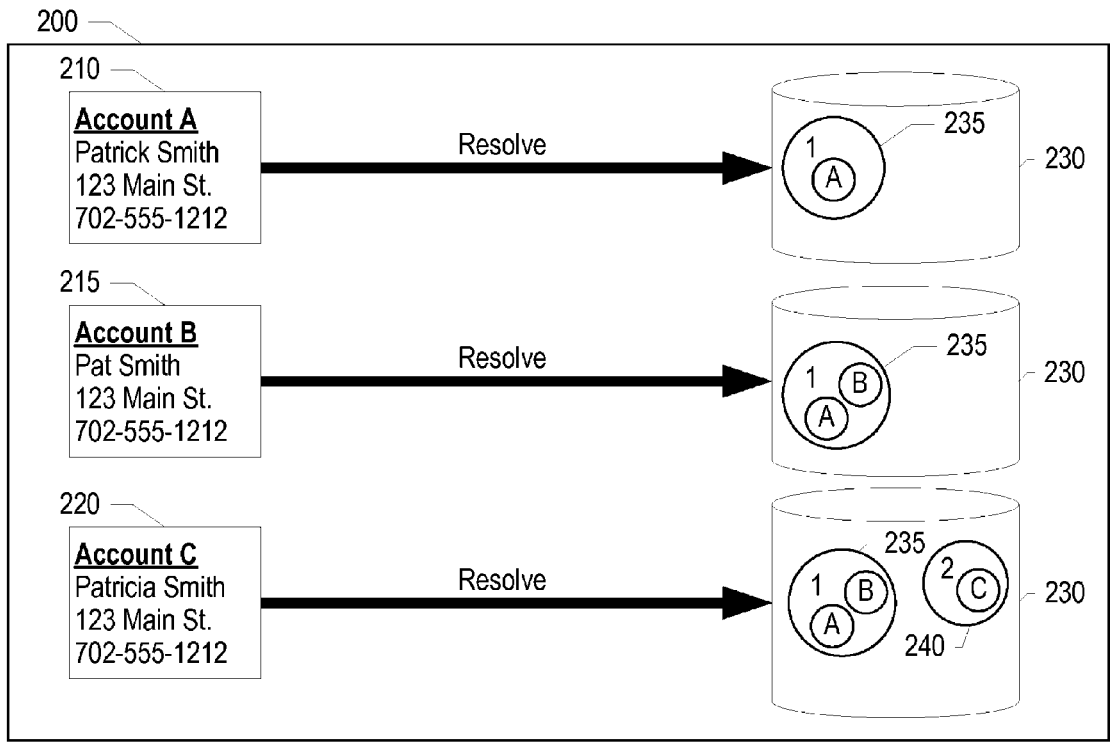
FIG. 2A is a diagram showing an order-specific resolution outcome based upon prior art.

FIG. 2A is a diagram showing an order-specific resolution outcome based upon prior art. Using prior art, a resolution's outcome may be dependent upon the order in which accounts are resolved. Diagram 200 shows three accounts being resolved, which are accounts 210, 215, and 220. Account 210 is first to resolve and resolves into entity 235 (located in storage 230). Storage 230 may be stored on a nonvolatile storage area, such as a computer hard drive.

Account 215 is next to resolve. Since entity 235 includes account A that includes account data "Patrick Smith, 123 Main St., 702-555-1212," account 215 also resolves into entity 235 because the only difference between account 210 and account 215 is that account 215 includes the name "Pat Smith" instead of "Patrick Smith," which may be the same person as Patrick Smith.

Finally, account 220 resolves. Account 220, however, includes the name "Patricia Smith" and, since entity 235 includes the name "Patrick Smith," account 220 resolves into a new entity 240. Prior art, however, does not check ambiguity between other entities. In fact, Pat Smith (account 215) may be the son or daughter of Patrick and Patricia Smith. The problem with this result is that the resolution outcome is dependent upon the order in which the accounts were resolved, and by changing the order of resolution, the resolution outcome changes (see FIG. 2B and corresponding text for further details).

Figure 2B:
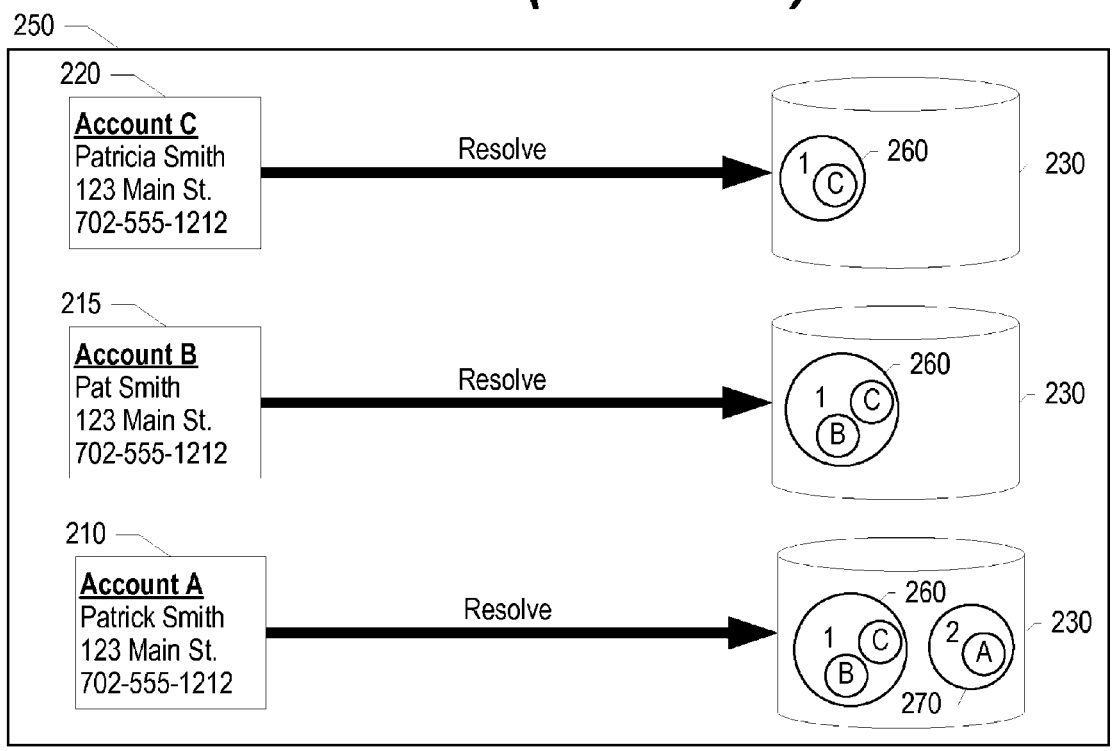
FIG. 2B is a diagram showing another order-specific resolution outcome based upon prior art.

FIG. 2B is a diagram showing another order-specific resolution outcome based upon prior art. FIG. 2B is similar to FIG. 2A with the exception of the order in which accounts 210-220 are resolved.

Diagram 250 shows that account 220 is first resolve, which resolves into entity 260. Next, account 215 resolves and, since account 215 includes the generic first name "Pat," it resolves into entity 260 because Pat Smith may be the same as Patricia Smith. Finally, account 210 resolves and, since Patrick Smith is clearly different that Patricia Smith, account 210 resolves into a new entity 270. Again, prior art does not evaluate whether previous resolutions are validated at this point. As can be seen, the resolution outcome of diagram 250 is different than the resolution outcome of diagram 200 shown in FIG. 2A because the order in which the accounts were resolved is different.

Figure 3A:
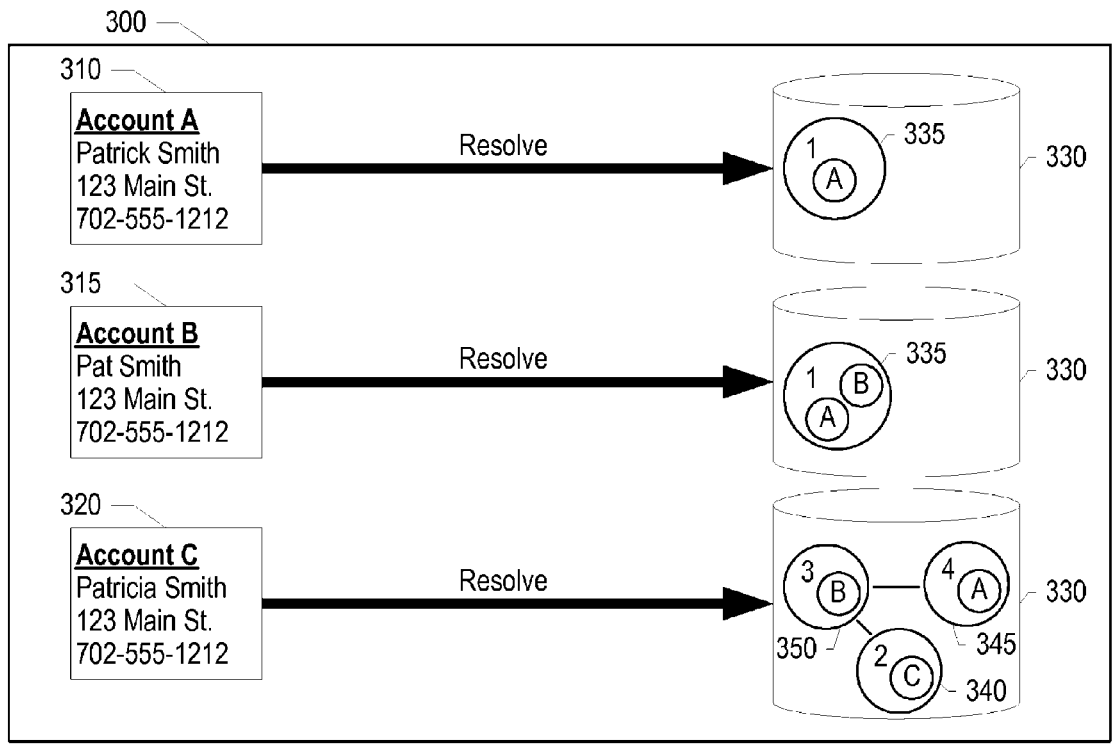
FIG. 3A is a diagram showing a first resolution order scenario that results in an independent order resolution outcome using the invention described herein.
Figure 3B:
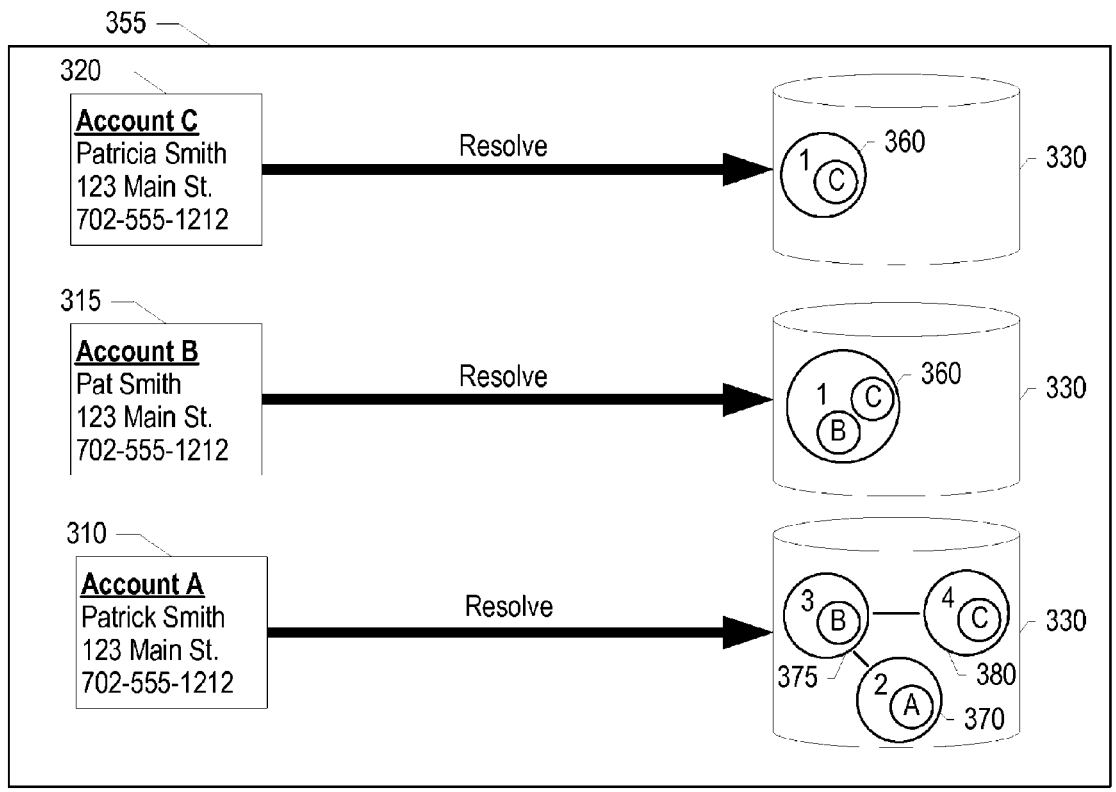
FIG. 3B is a diagram showing a second resolution order scenario that results in the same independent order resolution outcome as that shown in FIG. 3A.

FIG. 3A is a diagram showing a first resolution order scenario that results in an independent order resolution outcome using the invention described herein. FIGS. 3A and 3B are similar to FIGS. 2A and 2B with the exception being that FIGS. 3A and 3B produce the same resolution outcome, whereas FIGS. 2A and 2B produced different resolution outcomes.

Diagram 300 shows that account 310 resolves first, which resolves into entity 335 that is stored in storage area 330. Storage area 330 may be stored on a nonvolatile storage area, such as a computer hard drive. Next account 315 resolves. Since account 315 includes the first name "Pat," which may be the same person as "Patrick" in account 310, account 315 resolves into entity 335 as well. Next, account 320 resolves. Since account 320 includes the first name "Patricia" which is clearly different than Patrick, account 320 resolves into a new entity 340.

The invention described herein then evaluates whether to unresolve previous resolutions by analyzing the account data in order to detect ambiguities between the accounts. Using diagram 300 as an example, account 315 includes the first name "Pat," which now may match both accounts 310 and 320. Therefore, since ambiguity exists, entity 335 unresolves and creates two new entities (entities 345 and 350) that include accounts 310 and 315, respectively. In addition, the invention described herein identifies relationships between entities, and relates entity 350 to entities 340 and 345.

FIG. 3B is a diagram showing a second resolution order scenario that results in the same independent order resolution outcome as that shown in FIG. 3A. Diagram 355 shows that account 320 is first to resolve, which resolves into entity 360 and stored in storage area 330. Account 315 is next to resolve that, since account 315 includes the first name "Pat" which may be the same person as "Patricia," also resolves into entity 360. Finally, account 310 resolves and, since Patrick is clearly different than Patricia, account 310 resolves into a new entity 370.

Again, the invention described herein evaluates whether to unresolve previous resolutions by analyzing the account data in order to detect ambiguities between the accounts. Since account 315 (first name "Pat") may match both account 310 and 320, entity 360 is unresolved and two new entities are created (entities 375 and 380) and accounts 315 and 320 are included in the new entities. As can be seen, diagram 355's resolution outcome includes three separate entities that each include an account, which is the same resolution outcome as FIG. 3A discussed above. The invention described herein then identifies relationships between entities, and relates entity 350 to entities 340 and 345.

Figure 4:
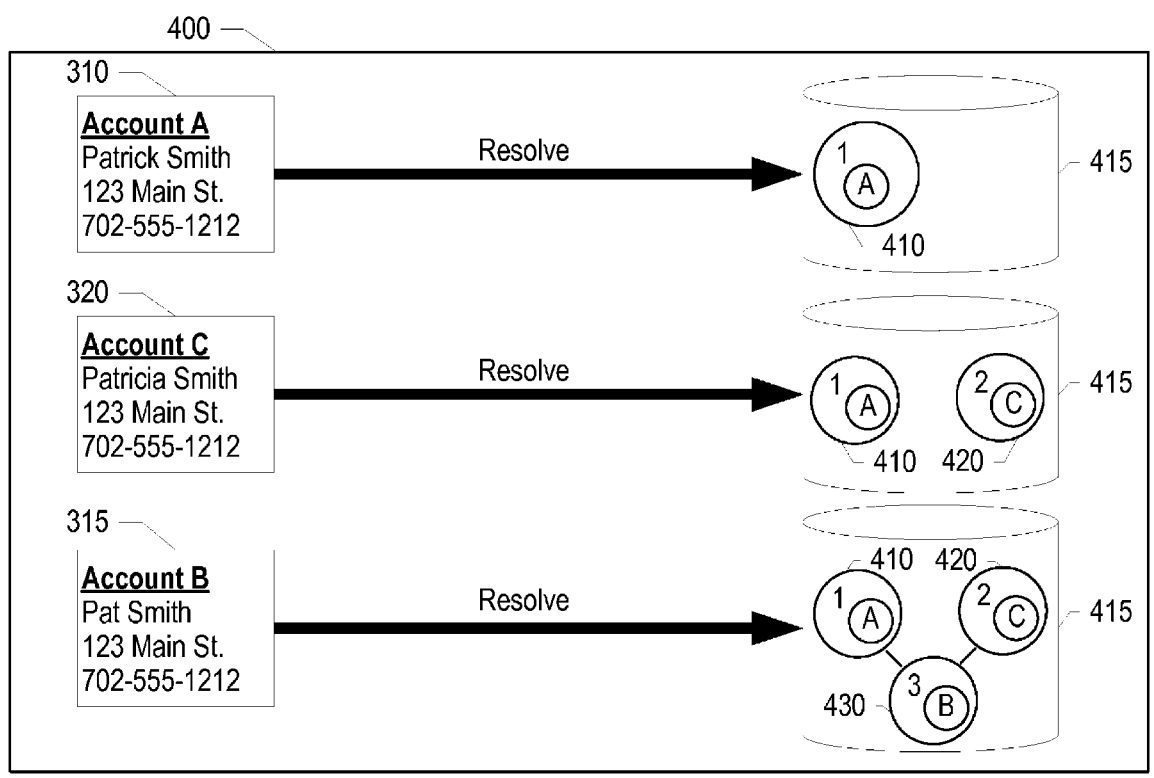
FIG. 4 is a diagram showing an ambiguous resolution that results in an entity relating to two entities.

FIG. 4 is a diagram showing an ambiguous resolution that results in an entity relating to two entities. Diagram 400 includes accounts 310, 315, and 320, which are the same as those shown in FIG. 3A. Account 310 resolves first into entity 410, which is stored in storage 415. Next, account 320 resolves into a different entity 420 because account 320 includes the first name "Patricia" which is clearly different than account 310's first name "Patrick." Storage 415 may be stored on a nonvolatile storage area, such as a computer hard drive.

Account 315 is next to resolve. Account 315 is equally resolvable to both entities 410 and 420 because it includes the same account data as both entities with the exception of the first name, whose first name "Pat" may be reference to the same person as either "Patrick" (entity 410) or "Patricia" (entity 420). In this scenario, the invention described herein does not resolve account 315 to either existing entity, but rather creates a new entity 430, includes account 315 into entity 430, and relates entity 430 to both entities 410 and 420 (see FIG. 8 and corresponding text for further details).

Figure 5:
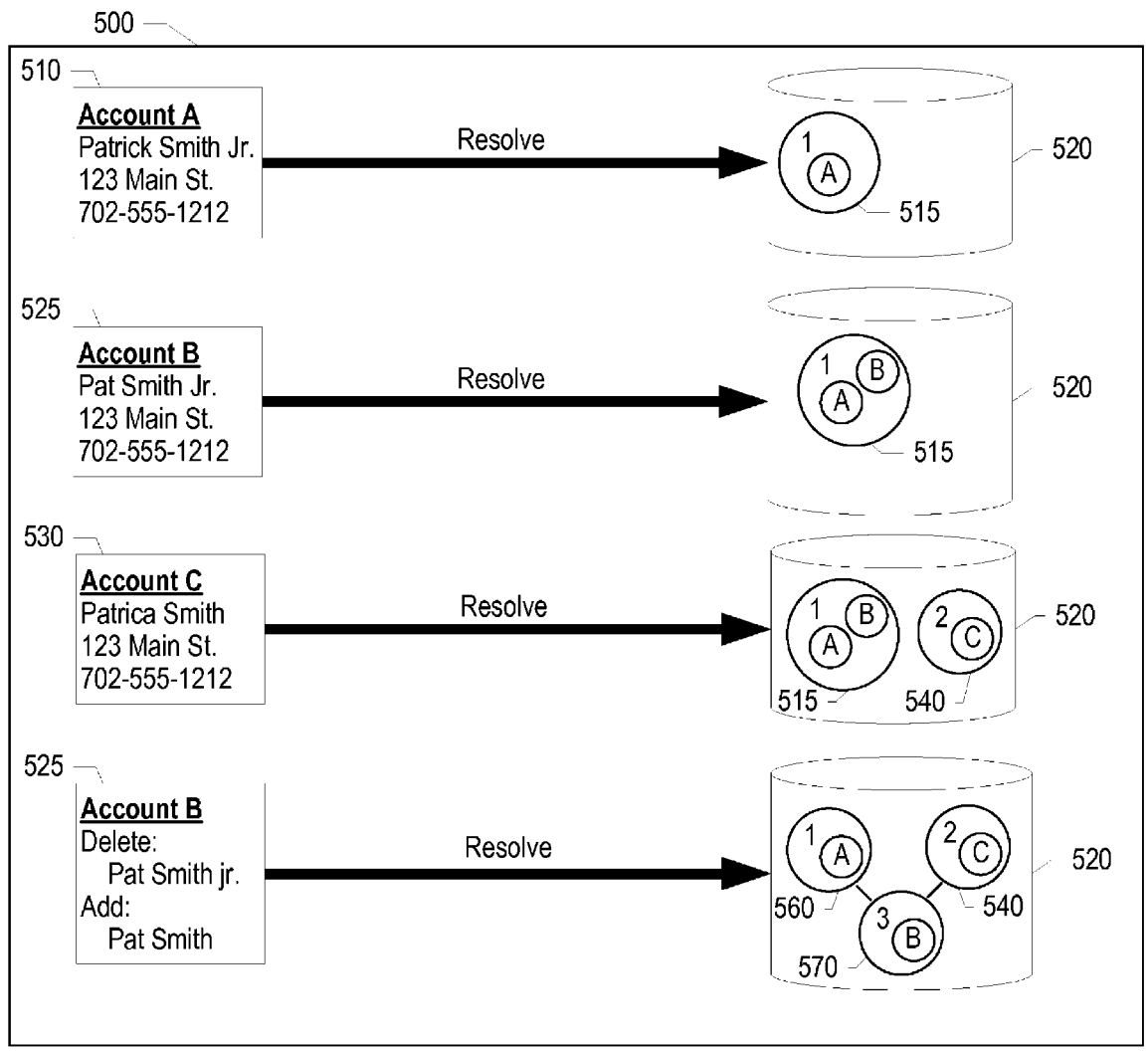
FIG. 5 is a diagram showing modifications of account data that results in unresolving an entity and relating entities to each other.

FIG. 5 is a diagram showing account data modifications that result in unresolving an entity and relating entities to each other. Diagram 500 shows that account 510 resolves first, which resolves into entity 515 that is stored in storage area 520. Storage area 520 may be stored on a nonvolatile storage area, such as a computer hard drive. Next account 525 resolves. Since account 525 includes the name "Pat Smith Jr.," which may be the same person as "Patrick Smith Jr." in account 510, account 525 resolves into entity 515 as well. Next, account 530 resolves. Since account 530 includes the name "Patricia Smith," which is clearly different than Patrick Smith Jr. and Pat Smith Jr., account 530 resolves into a new entity 540 and entity 515 stays in tact.

Subsequently, data included in account B 525 is modified such that the name "Pat Smith Jr." is changed to "Pat Smith." As a result, ambiguity exists because account B 525 is now resolvable to either account A 510 (Patrick Smith Jr.) or account C 530 (Patricia Smith). Therefore, entity 515 unresolves and creates two new entities (entities 560 and 570) that include accounts 510 and 525, respectively. In addition, the invention described herein identifies relationships between the entities, and relates entity 570 to entities 560 and 540.

FIG. 6 is a high-level flowchart showing steps taken in resolving an account to existing entities. Processing commences at 600, whereupon processing retrieves an account from data store 120 at step 610. The account includes account data, such as a name, address, and telephone number. At step 620, processing resolves the account to existing entities that are located in entity store 130. For example, the retrieved account may include a name and address that matches an existing entity. Data store 120 and entity store 130 are the same as that shown in FIG. 1.

A determination is made as to the result of the resolution that was performed at step 620 (decision 630). If the account did not resolve to an existing entity, decision 630 branches to "No Resolution" branch 632 whereupon processing creates a new entity in entity store 130 (step 640) and includes the retrieved account in the new entity (step 645).

A determination is made as to whether the new entity has relationships with other entities included in entity store 130 (decision 650). For example, the new entity may include the same address as another entity, but also includes a different name than the other entity. If the new entity has a relationship with one or more other entities, decision 650 branches to "Yes" branch 652 whereupon processing proceeds through load order independence steps in order to ensure an independent order resolution outcome (pre-defined processing block 660, see FIG. 7 and corresponding text for further details). On the other hand, if the new entity does not have a relationship to another entity, decision 650 branches to "No" branch 654 whereupon processing ends at 655.

If step 620 results in a resolution to an entity and changes the data within the entity, decision 630 branches to "Resolution with Data Changes" branch 633. For example, the retrieved account may include a name, address, and social security number, which resolved into an entity that included the same name and address. In this example, the resolution resulted in the addition of the social security number to the entity. Processing then proceeds through load order independence steps in order to ensure an independent order resolution outcome (pre-defined processing block 660, see FIG. 7 and corresponding text for further details). Processing ends at 665.

If step 620 results in a resolution to an entity that does not change the data within the entity, decision 630 branches to "Resolution with no Data Changes" branch 634 whereupon processing ends at 635. For example, the retrieved account may include a name and address that resolved into an entity that included the same name and address. In this example, the resolution does not change the entity's existing data.

FIG. 7 is a flowchart showing steps taken in processing an account that results in an independent order resolution outcome. Load order independence processing commences at 700, whereupon a determination is made as to the type of order evaluation to perform (decision 705). If the account was previously resolved and new account data was added, decision 705 branches to "Previous Resolution with New Data" branch 706 whereupon processing evaluates whether to unresolve the resolved entity (step 710). For example, the new account data may include information, such as a "Mr." or "Mrs.," that conflicts with other accounts within the entity.

A determination is made as to whether resolution conflicts exist based upon the evaluation performed at step 710 (decision 715). If no resolution conflicts exist, decision 715 branches to "No " branch 717 whereupon processing returns at 720. On the other hand, if resolution conflicts exist, decision 715 branches to "Yes" branch 719 whereupon processing unresolves the account from the conflicting entity at step 730, and returns at 735.

If the account was previously resolved and account data was deleted, decision 705 branches to "Previous Resolution with Deleted Data" branch 707 whereupon processing evaluates whether to unresolve the resolved entity (step 740). For example, the account data may have been updated that results in the removal of a social security number. In this example, the account may now be ambiguously resolvable to multiple entities.

A determination is made as to whether ambiguities exist within the entity based upon the evaluation performed at step 740 (decision 745). If ambiguities exist, decision 745 branches to "Yes" branch 747 whereupon processing unresolves the ambiguous account at step 775 and proceeds through a series of ambiguity processing steps (pre-defined process block 780, see FIG. 8 and corresponding text for further details).

On the other hand, if ambiguities do not exist, decision 745 branches to "No" branch 749 whereupon a determination is made as to whether resolution conflicts exist in response to deleting the account data (decision 750). For example, data may have been deleted from an account such that the account no longer has enough supporting data to continue to be resolved with its current entity. If resolution conflicts exist, decision 750 branches to "Yes" I branch 752 whereupon processing unresolves the account from the conflicting entity at step 730. On the other hand, if no resolution conflicts exist, decision 750 branches to "No" branch 754 whereupon processing returns at 755.

If the account/entity is a new account/entity that has relationships with other entities, decision 705 branches to "New Account/Entity with Relationships" branch 708 whereupon processing evaluates whether to unresolve one or more of the related entities (step 760). For example, the addition of the new account may cause accounts within the related entity to become ambiguous (see FIGS. 3A, 3B, and corresponding text for further details).

A determination is made as to whether ambiguities exist with the related entities based upon the evaluation performed at step 760 (decision 765). If ambiguities do not exist, decision 765 branches to "No" branch 767 whereupon processing returns at 770. On the other hand, if ambiguities exist, decision 765 branches to "Yes" branch 769 whereupon processing unresolves the ambiguous accounts at step 775, and proceeds through a series of ambiguity processing steps to place the account in a particular entity and relate the entity to other entities if applicable (pre-defined process block 780, see FIG. 8 and corresponding text for further details). Processing returns at 785.

Figure 8:
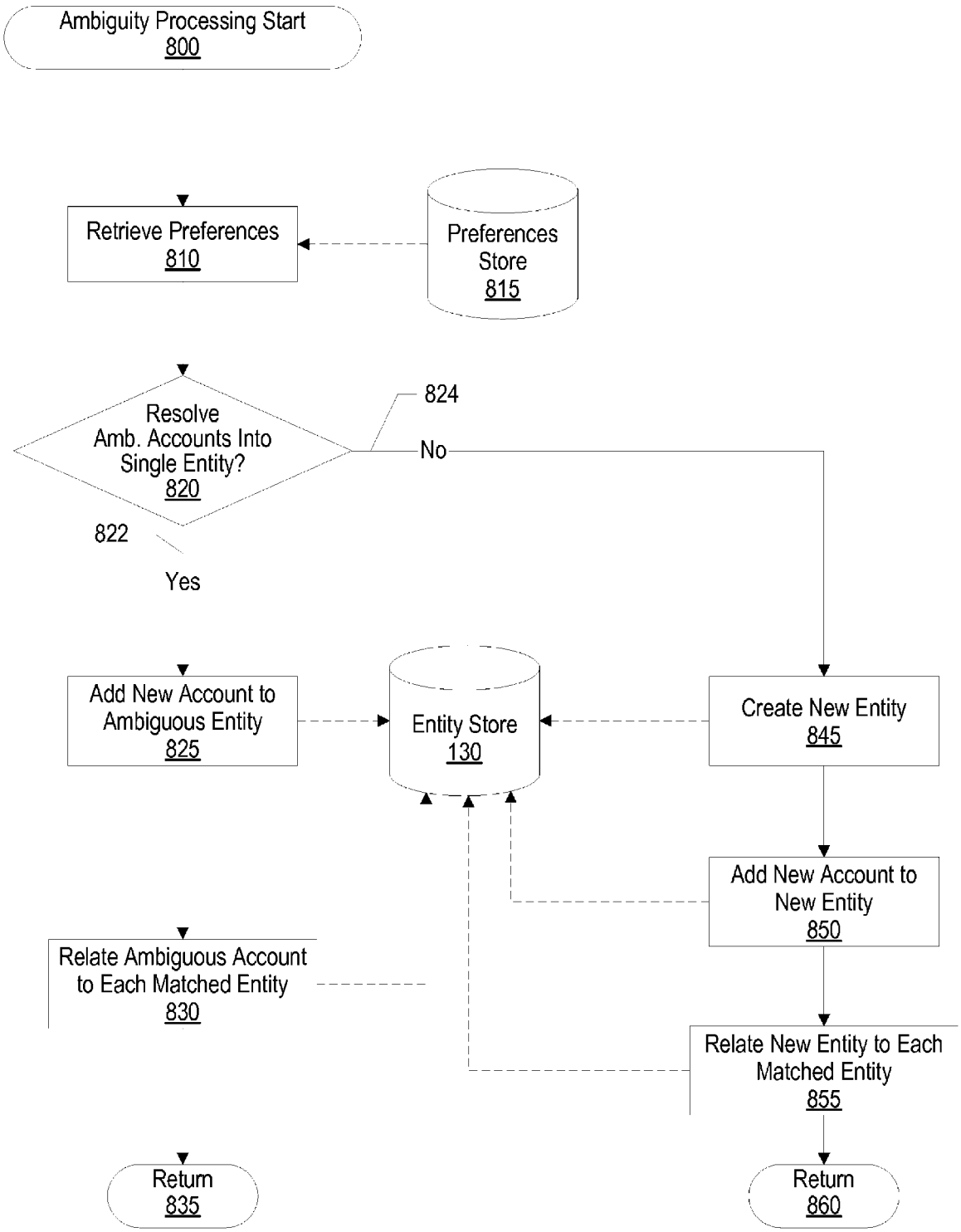
FIG. 8 is a flowchart showing steps taken in processing an ambiguously resolvable account.

FIG. 8 is a flowchart showing steps taken in processing an ambiguously resolvable account. Processing commences at 800, whereupon processing retrieves ambiguity preferences, which may have been generated by a user, from preferences store 815 at step 810. Preferences store 815 may be stored on a nonvolatile storage area, such as a computer hard drive.

A determination is made, based upon the retrieved preferences, whether to include the ambiguous account into a single ambiguous entity, such as a "catch all" for ambiguous entities, or whether to create a separate entity for each individual ambiguous account (decision 820). If processing should include the ambiguous account into a single ambiguous entity, decision 820 branches to "Yes" branch 822 whereupon processing adds the account to the single ambiguous entity located in entity store 130 (step 825). Entity store 130 is the same as that shown in FIG. 1.

At step 830, processing relates the ambiguous entity, which includes the ambiguous account, with those entities from which it ambiguously resolves. These relationships are differentiated from other relationships in order to signify that the ambiguous entity is resolvable to those entities from which it ambiguously resolves. For example, the ambiguous account may include a name and address that matches two different entities. In this example, processing relates the ambiguous account to the two matched entities. Processing returns at 835.

On the other hand, if processing should create a new entity for each ambiguous entity, decision 820 branches to "No" branch 824 whereupon processing creates a new entity in entity store 130 at step 845. At step 850, processing includes the ambiguous account in the newly created entity. Processing then relates the new entity, which includes the ambiguous account, with other entities that match its account data. As discussed in the example above, the ambiguous account may include a name and address that matches two different entities. Processing returns at 860.

Figure 9:
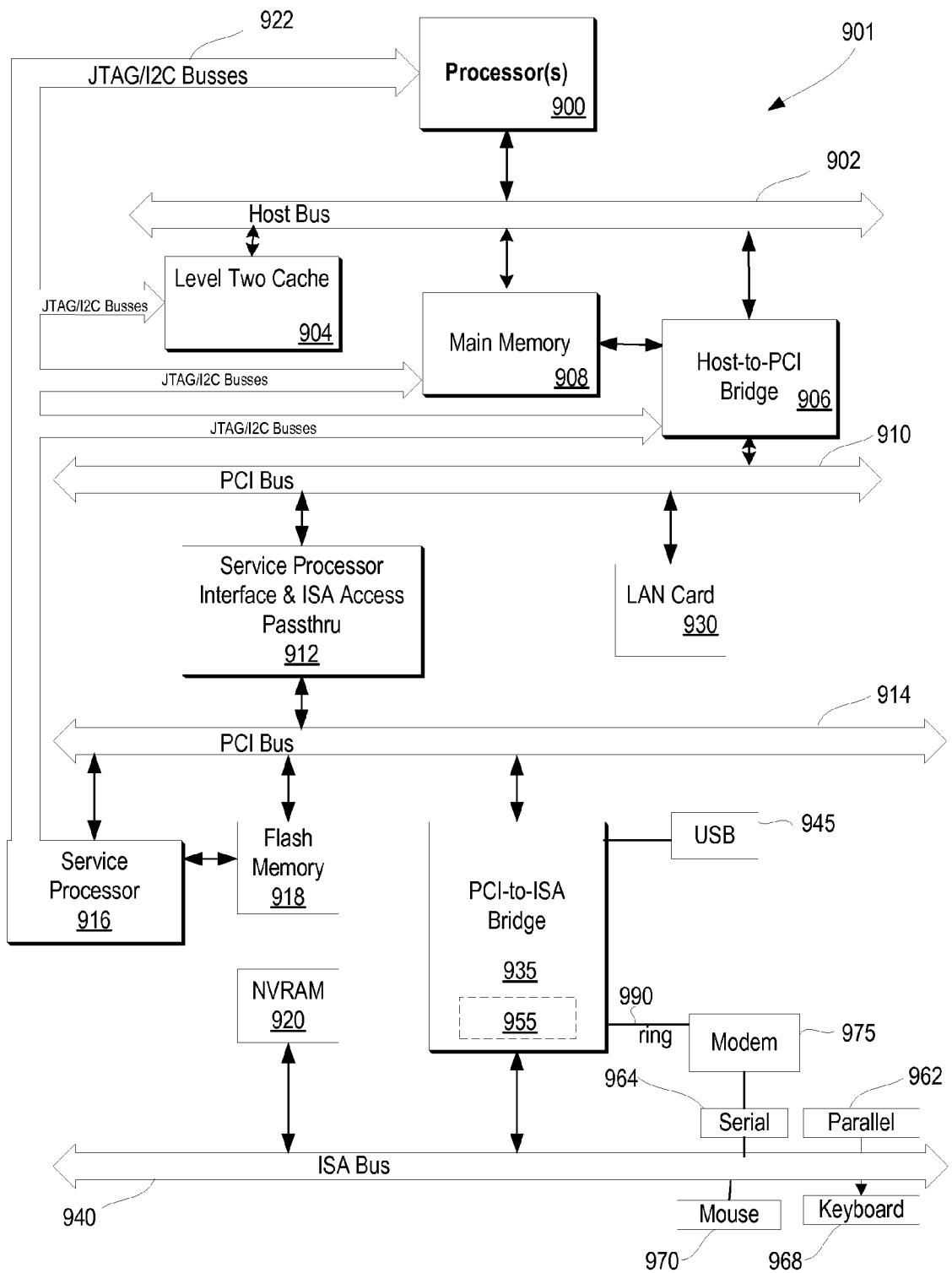
FIG. 9 is a block diagram of a computing device capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 995 is connected to serial port 964 and PCI-to-ISA Bridge 935.

While FIG. 9 shows one information handling system that employs processor(s) 900, the information handling system may take many forms. For example, information handling system 901 may take the form of a desktop, server, portable, laptop, notebook, or other form factor computer or data processing system. Information handling system 901 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   retrieving a first account, the first account including first account data;
   resolving the first account to a plurality of entities stored in a storage area;
   in response to the resolving, identifying an ambiguity between the first account and one or more of the plurality of entities, the identifying resulting in one or more ambiguous entities; and
   re-resolving the first account to one or more of the plurality of entities stored in the storage area in response to the identified ambiguity.

2. The method of claim 1 wherein the ambiguity is identified by determining that the first account data equally matches data included in a first entity and a second entity, the first entity and the second entity included in the one or more ambiguous entities.

3. The method of claim 2 wherein the first entity includes the first account and a second account, and the second entity includes a third account, the re-resolving further comprising:
   unresolving the first entity.

4. The method of claim 3 further comprising:
   in response to the unresolving, creating a third entity and including the first account in the third entity;
   in response to the unresolving, creating a fourth entity and including the second account in the fourth entity; and
   relating the third entity to the second entity and the fourth entity.

5. The method of claim 3 further comprising:
   detecting that one of the ambiguous entities is also related to one or more of the plurality of entities that are not included in the one or more ambiguous entities.

6. The method of claim 2 wherein the first account is not included in the first entity or the second entity, the method further comprising;
   creating a third entity; and
   including the first account in the third entity.

7. The method of claim 6 further comprising:
relating the third entity to the first entity and the second entity.

8. The method of claim 6 further comprising:
detecting that one of the ambiguous entities is also related to one or more of the plurality of entities that are not included in the one or more ambiguous entities.

9. The method of claim 2 wherein, prior to the identifying, the first entity includes the first account and a second account, and the second entity includes a third account, the processing further comprising:
modifying the first account data, which results in the ambiguity that is between the first entity and the second entity;
unresolving the first entity;
in response to the unresolving, creating a third entity and including the first account into the third entity; and
in response to the unresolving, creating a fourth entity and including the second account in the fourth entity.

10. The method of claim 9 further comprising:
relating the third entity to the second entity and the fourth entity.

11. The method of claim 9 further comprising:
detecting that one of the ambiguous entities is also related to one or more of the plurality of entities that are not included in the one or more ambiguous entities.

12. The method of claim 1 wherein the re-resolving results in an independent order resolution outcome.

13. The method of claim 1 wherein the first account data is a representation selected from the group consisting of a person, a place, an event, a time, an object, a biometric, and a protein.

14. The method of claim 1 wherein each of the plurality of entities is a representation selected from the group consisting of a person, a place, an event, a time, an object, a biometric, and a protein.

15. The method of claim 1 wherein the first account data is selected from the group consisting of clear text values, encrypted text values, one-way hashed values, and anonymized values.

16. A computer program product stored on a computer operable media, the computer operable media containing instructions for execution by a computer, which, when executed by the computer, cause the computer to implement a method for account resolution, the method comprising:
retrieving a first account, the first account including first account data;
resolving the first account to a plurality of entities stored in a storage area;
in response to the resolving, identifying an ambiguity between the first account and one or more of the plurality of entities, the identifying resulting in one or more ambiguous entities; and
re-resolving the first account to one or more of the plurality of entities stored in the storage area in response to the identified ambiguity.

17. The computer program product of claim 16 wherein the ambiguity is identified by determining that the first account data equally matches data included in a first entity and a second entity, the first entity and the second entity included in the one or more ambiguous entities.

18. The computer program product of claim 17 wherein the first entity includes the first account and a second account, and the second entity includes a third account, the method further comprising:
unresolving the first entity.

19. The computer program product of claim 18 wherein the method further comprises:
in response to the unresolving, creating a third entity and including the first account in the third entity;
in response to the unresolving, creating a fourth entity and including the second account in the fourth entity; and
relating the third entity to the second entity and the fourth entity.

20. The computer program product of claim 18 wherein the method further comprises:
detecting that one of the ambiguous entities is also related to one or more of the plurality of entities that are not included in the one or more ambiguous entities.

21. The computer program product of claim 17 wherein the first account is not included in the first entity or the second entity, the method further comprising;
creating a third entity; and
including the first account in the third entity.

22. The computer program product of claim 21 wherein the method further comprises:
relating the third entity to the first entity and the second entity.

23. The computer program product of claim 21 wherein the method further comprises:
detecting that one of the ambiguous entities is also related to one or more of the plurality of entities that are not included in the one or more ambiguous entities.

24. The computer program product of claim 17 wherein, prior to the identifying, the first entity includes the first account and a second account, and the second entity includes a third account, the method further comprising:
modifying the first account data, which results in the ambiguity that is between the first entity and the second entity;
unresolving the first entity;
in response to the unresolving, creating a third entity and including the first account into the third entity; and
in response to the unresolving, creating a fourth entity and including the second account in the fourth entity.

25. The computer program product of claim 24 wherein the method further comprises:
relating the third entity to the second entity and the fourth entity.

26. The computer program product of claim 24 wherein the method further comprises:
detecting that one of the ambiguous entities is also related to one or more of the plurality of entities that are not included in the one or more ambiguous entities.

27. An information handling system comprising:
one or more processors;
a memory accessible by the processors;
one or more nonvolatile storage devices accessible by the processors; and
an resolution management tool for resolving accounts, the resolution management tool being effective to:
retrieve a first account from one of the nonvolatile storage devices, the first account including first account data;
resolve the first account to a plurality of entities included in one of the nonvolatile storage devices;
in response to the resolving, identify an ambiguity between the first account and one or more of the plurality of entities, the identifying resulting in one or more ambiguous entities; and
process the first account based upon the identified ambiguity.

28. The information handling system of claim 27 wherein the ambiguity is identified by determining that the first account data equally matches data included in a first entity and a second entity, the first entity and the second entity included in the one or more ambiguous entities.

29. The information handling system of claim 28 wherein the first entity includes the first account and a second account, and the second entity includes a third account, the resolution management tool further effective to:

unresolve the first entity.

30. The information handling system of claim 29 wherein the resolution management tool is further effective to:

in response to the unresolving, create a third entity in one of the nonvolatile storage devices and include the first account in the third entity;

in response to the unresolving, create a fourth entity in one of the nonvolatile storage devices and include the second account in the fourth entity; and relate the third entity to the second entity and the fourth entity.

31. The information handling system of claim 29 wherein the resolution management tool is further effective to:

detect that one of the ambiguous entities is also related to one or more of the plurality of entities that are not included in the one or more ambiguous entities.

32. The information handling system of claim 28 wherein the first account is not included in the first entity or the second entity, the resolution management tool further effective to:

create a third entity in one of the nonvolatile storage devices; and include the first account in the third entity.

33. The information handling system of claim 32 wherein the resolution management tool is further effective to:

relate the third entity to the first entity and the second entity.

34. The information handling system of claim 32 wherein the resolution management tool is further effective to:

detect that one of the ambiguous entities is also related to one or more of the plurality of entities that are not included in the one or more ambiguous entities.

35. The information handling system of claim 28 wherein, prior to the identifying, the first entity includes the first account and a second account, and the second entity includes a third account, the resolution management tool further effective to:

modify the first account data, which results in the ambiguity that is between the first entity and the second entity;

unresolve the first entity;

in response to the unresolving, create a third entity and include the first account into the third entity;

in response to the unresolving, create a fourth entity and include the second account in the fourth entity;

relate the third entity to the second entity and the fourth entity; and detect that one of the ambiguous entities is also related to one or more of the plurality of entities that are not included in the one or more ambiguous entities.

\* \* \* \* \*